Nov. 14, 1944.  W. E. CECIL  2,362,883

TIRE PRESSURE INDICATING SYSTEM

Filed Feb. 15, 1941  2 Sheets-Sheet 1

INVENTOR.
William E. Cecil
BY Lancaster, Allwine & Rommel
ATTORNEYS.

Nov. 14, 1944.  W. E. CECIL  2,362,883
TIRE PRESSURE INDICATING SYSTEM
Filed Feb. 15, 1941  2 Sheets-Sheet 2
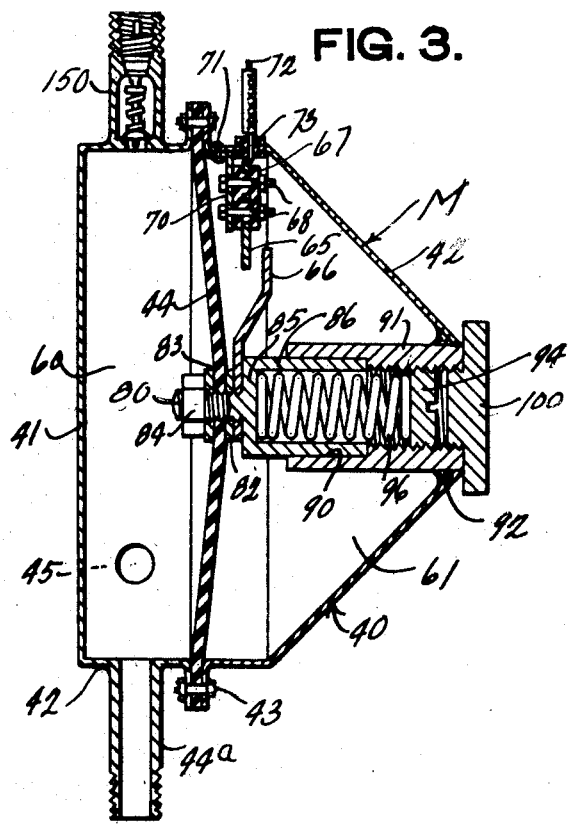
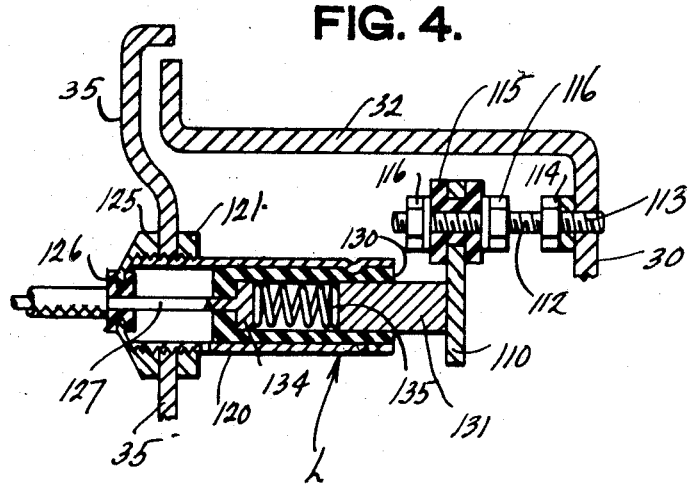
INVENTOR.
William E. Cecil
BY Lancaster, Allwine and Rommel
ATTORNEYS.

Patented Nov. 14, 1944

2,362,883

UNITED STATES PATENT OFFICE 2,362,883

TIRE PRESSURE INDICATING SYSTEM

William Evan Cecil, High Point, N. C.

Application February 15, 1941, Serial No. 379,140

2 Claims. (Cl. 200—58)

This invention relates to improvements in tire pressure indicating systems.

The primary object of this invention is the provision of improved means for notifying the operator of a vehicle when the tires of the vehicle fall below a predetermined pressure.

A further object of this invention is the provision of an improved tire pressure indicator adapted to be associated with dual tired wheels of a vehicle so that the operator of the vehicle will be instantly advised of dangerous low pressure in any tire of the vehicle.

A further object of this invention is the provision of an improved tire pressure indicating system adapted to be used in connection with dual tired wheels having improved means for inflating and deflating the tires of a wheel simultaneously.

A further object of this invention is the provision of improved means for maintaining a uniform pressure in the dual tires of a wheel.

A further object of this invention is the provision of an improved tire pressure indicating means which will give greater safety of vehicle operation, with considerable saving of maintenance expense, especially in connection with dual tired wheels.

Other objects and advantages of the invention will be apparent during the course of the following detailed description.

In the accompanying drawings forming a part of this specification, and wherein similar reference characters designate corresponding parts throughout the several views, Figure 1 is a vertical sectional view taken through a vehicle wheel having dual tires, showing the improved tire pressure indicating system associated therewith.

Figure 3 is an enlarged vertical cross sectional view taken through a pressure control switch of the indicating system.

Figure 4 is an enlarged cross sectional view showing the details of a contact arrangement for closing a circuit between the rotating and non-rotating parts of the vehicle wheel and chassis.

Figure 1:
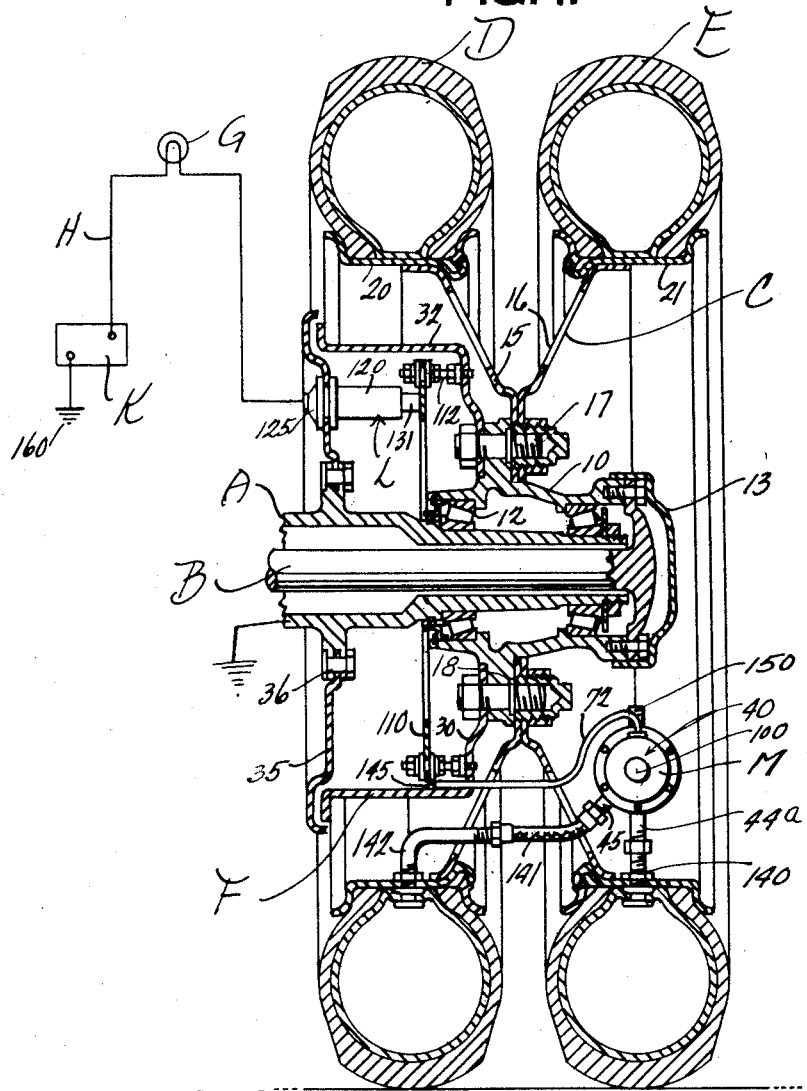
Figure 2:
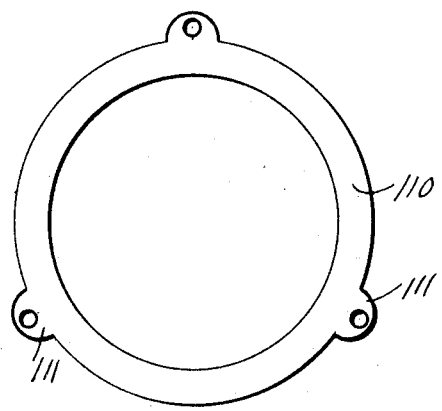
Figure 2 is a side elevation of an electrical contact ring associated with the indicating system.

In the accompanying drawings, wherein for the purpose of illustration is shown only a preferred embodiment of the invention, the letter A may generally designate part of a vehicle chassis such as the axle housing, within which is received the rotating axle B. A wheel assemblage C adapted to receive dual tires D and E is rotatably mounted upon the axle housing and keyed to the axle B. A brake drum assemblage F is also associated with the wheel structure C and the axle housing A. The improved tire pressure indicating system includes an alarm or indicator G connected in a circuit H which receives electrical energy from a source K. Circuit H includes an improved contact arrangement L for continuance of the circuit between the rotating and non-rotating parts of the chassis A and wheel C. The system furthermore includes an improved pressure actuated switch mechanism M controlled by pressure in the tires D and E.

While the improved features of this invention are particularly well adapted for use in connection with dual tired wheels, they are also applicable to single tired wheels, such as the steering wheels of a vehicle.

In the example shown, the axle housing A has the axle B rotatably housed therein in the usual manner. The wheel structure C includes a hub 10 mounted by antifriction bearings 12 upon the axle housing A and, of course, keyed by means 13 to the drive axle B. The wheel structure further includes separate discs 15 and 16 which are bolted at 17 to the flange 18 of the hub 10. The discs 15 and 16 are provided with rims 20 and 21 respectively supporting the pneumatic tires D and E in the usual relation.

The brake drum assemblage F includes the brake drum disc 30 also bolted by the means 17 to the hub flange 18 and furthermore includes the brake drum 32. The axle housing A has the brake drum dust plate 35 bolted at 36 thereto, in the usual manner.

Referring at this time to the pressure actuated switch means M illustrated in detail in Figure 3 of the drawings and shown in its assemblage with respect to the tire in Figure 1, the same includes a casing 40 comprising portions 41 and 42 which are bolted together at 43, and clamp therebetween a disc shaped diaphragm 44 of any approved flexible and durable diaphragm material. The casing portion 41 includes a circumferential portion 42 having radially extended externally screw threaded tubular shanks 44a and 45 adapted to be communicated with the tires E and D respectively. The housing or casing portion 42 is frusto-conical in shape. Of course, the diaphragm 44 subdivides the housing or casing 40 into a pressure compartment 60 and a switch compartment 61.

The switch of the improved device M consists of a stationary contact 65 secured upon the housing or casing 40, and a movable contact 66 secured to the diaphragm 44, for movement therewith. The switch contact 65 is attached between portions of an insulation block 67, held together by means of bolts 68, shown in Figure 3. The insulation block 67 is secured upon a bracket 70, the latter being attached at 71 upon the housing or casing portion 42, as shown in Figure 3. The wire 72 of the electric circuit extends into the housing portion 42 through an insulation bushing 73, and is clamped in the insulation block 67 in engagement with the stationary contact 65.

The movable contact 66 is mounted upon a screw threaded shank 80 which extends through a central opening in the diaphragm 44. This screw threaded shank 80 is provided with washers 82 and 83 at opposite sides of the diaphragm, and a nut 84 is threaded upon the shank 80 in the pressure compartment of the casing 40. The shank 80 is preferably integrally connected upon a wall 85 of a cylindrical shaped piston 86; the contact 66 being in engagement with the external surface of the wall 85 and clamped thereagainst by the nut 84, with the washer 82 between this contact 65 and the diaphragm 44.

The hollow piston 86 is slidably mounted within a socket 90 of a tubular extension 91 which is rigidly connected at 92 upon the outer end of the conical shaped casing portion 42, as shown in Figure 3. This tubular support 91 extends into the compartment 61. It is internally screw threaded for receiving a spring compression adjusting nut 94. A spring 96, under compression, is disposed between the compression adjusting nut 94 and the wall 85 of the piston, and normally urges the diaphragm 44 toward the pressure compartment 60. The screw threaded internal passageway of the piston supporting tube 91 opens externally of the casing portion 42 and there receives the dust cap 100. Of course, in order to adjust the compression of the spring, it is necessary to remove the dust cap 100 and engage a screw driver in the kerf of the nut 94.

Referring to the arrangement L, the same includes a ring shaped contact 110 provided with apertured lugs 111, adapted to receive screw threaded supporting members 112. The latter is adjustably threaded at 113 upon the disc portion 30 of the brake drum; lock nuts 114 being provided to insure the attachment of the shank upon the brake drum. A suitable insulation bushing 115 is disposed in the aperture of each lug 111 and receives a screw threaded shank 112 therethrough. Nuts and washers 116 are provided on the screw threaded shank 112 at opposite sides of the insulation bushing 115 in order to properly space the contact ring 110 in the brake drum. This arrangement provides for relative adjustment of the contact ring 110 across the brake drum.

The dust plate 35 of the brake mechanism of the wheel assemblage adjustably supports a jacket or casing 120 on a horizontal axis. This casing 120 may be threaded in a suitable opening in the dust plate 35, as shown in Figure 4, and retained in some such adjustment by a lock nut 121 and a cap 125. The latter is provided with an insulation bushing 126 thru which is extended a contact wire 127 forming part of the circuit H.

Within the housing or jacket 120 is disposed a tubular insulation sleeve 130 adapted to slidably receive a metallic contact brush 131. The wire 127 extends into an end of the compartment in the sleeve 120 and is there enlarged at 134. A coil spring 135 under compression engages this portion 134 of the wire and normally urges the contact brush 131 against the contact ring 110, as shown in Figure 4.

Referring again to the air pressure actuated switch mechanism M, the screw threaded tubular shank 44a is suitably connected at 140 with the inlet duct to the inner tube of the tire E. The other tubular shank 45 is connected by means of a flexible conduit 141 to an L shaped tube or duct 142 having inlet with the inner tube of the tire D. The wire 72 of the stationary contact 65 extends in insulated relation into the brake drum compartment and there is connected at 145 with the contact ring 110, as shown in Figure 1.

The housing portion 41 of the pressure actuated switch mechanism M is provided with a conventional tire valve assemblage 150, shown in Figure 3. Through this mechanism 150 both tires D and E may be inflated or deflated, as is readily apparent.

The complete circuit will be obvious from the foregoing. The battery or power source K is grounded at 160. The circuit wire extends therefrom to the electrical indicator G and thence to the wire 127 above described. The contact mechanism L maintains the circuit unbroken between the stationary and movable portions of the wheel assemblage. The contacts 65 and 66 furnish a switch mechanism which controls actuation of the electrical indicator. Should the pressure in either or both of the tires D and E become too low for safety, the diaphragm 44 will move responsive to low pressure existing in the compartment of the housing portion 41 and close the switch. Through connection of the casing 40 of the pressure actuated switch mechanism M with the rim of the wheel E the other end of the circuit H is grounded upon the chassis of the vehicle.

Various changes in the shape, size, and arrangement of parts may be made to the form of invention herein shown and described, without departing from the spirit of the invention or the scope of the claims.

I claim:

1. In an air pressure signalling system for pneumatic tires of vehicle wheels, the combination of a casing having a chamber therein, a flexible diaphragm located in said casing chamber so as to provide an air pressure compartment at one side thereof and a second compartment at the opposite side thereof, means for admitting air pressure to said air pressure compartment, adjustable spring means normally urging said diaphragm towards the air pressure compartment, said spring means being located in the said mentioned second compartment, and a pair of contacts in said second compartment one of which is fixedly carried by the casing and the other of which is connected for movement with said diaphragm whereby it will engage the first mentioned contact when the pressure falls below a predetermined amount.

2. In a pressure indicating system a switch comprising a casing having a chamber therein, a diaphragm mounted in the casing subdividing the same into a pressure compartment, and a second compartment at the opposite side thereof, means for admitting pressure to said pressure compartment, a sleeve carried by the casing fixedly extending into the second compartment and being internally screw threaded, a sleeve detachably connected centrally with the diaphragm and telescopically slidable in the first mentioned sleeve, a barrel spring in said sleeves normally urging the diaphragm towards the pressure compartment, an adjustable nut screw threaded in said first mentioned sleeve and having a nut head extending exteriorly of the casing for adjustment to vary the tension of said spring, a fixed contact upon the casing extending into the second compartment, and a contact carried by the diaphragm sleeve and movable with the diaphragm for engagement with the first mentioned contact when the diaphragm moves towards the pressure compartment responsive to spring action and low pressure in said pressure compartment.

WILLIAM EVAN CECIL.